United States Patent

[11] 3,569,922

[72] Inventor Josephus O. Parr, Jr.
San Antonio, Tex.
[21] Appl. No. 763,498
[22] Filed Sept. 30, 1968
[45] Patented Mar. 9, 1971
[73] Assignee Petty Geophysical Engineering Company
San Antonio, Tex.

[54] METHOD FOR ELIMINATING SELECTED NOISE DISTURBANCES FROM SEISMIC RECORDINGS
6 Claims, 3 Drawing Figs.
[52] U.S. Cl.................................................. 340/15.5
[51] Int. Cl................................................... G01v 1/28
[50] Field of Search........................................ 340/15.5,
(COMP), (GC), (MRC), (TCD)

[56] References Cited
UNITED STATES PATENTS
| | | | |
|---|---|---|---|
| 1,919,917 | 7/1933 | Truman......................... | 340/15.5 |
| 2,440,971 | 5/1948 | Palmer......................... | 340/15.5 |
| 2,698,927 | 1/1955 | Parr............................. | 340/15.5 |
| 3,209,322 | 9/1965 | Doty............................ | 340/15.5 |
| 3,352,377 | 11/1967 | Cetrone et al. ............... | 340/15.5 |

Primary Examiner—Richard A. Farley
Assistant Examiner—Daniel C. Kaufman
Attorney—Watson, Cole, Grindle & Watson ABSTRACT: A method for attenuating undesirable seismic noise disturbances by providing an effective adjustable attenuation bandwidth between the attenuation afforded by the geophone spread and stacking. The attenuation bandwidth is obtained from the individually recorded seismic traces at a series of selected impact locations and by weighting the individual data according to specified formulae prior to summing the data and stacking it in a conventional manner.

Patented March 9, 1971

INVENTOR
JOSEPHUS O. PARR, JR.

BY

ATTORNEY

METHOD FOR ELIMINATING SELECTED NOISE DISTURBANCES FROM SEISMIC RECORDINGS

This invention relates to a method of enhancing the signal to noise ratio of seismic recordings and, more particularly, to a method for attenuating excessive noise in a bandwidth intermediate to that attenuated by the geometry of the geophones and the stacking of the seismic traces.

The wavelengths of seismic noise disturbances vary in a continuum from short to very long wavelengths. An array of uniformly spaced, equally effective geophones will provide moderate attenuation for wavelengths from $(1 + 1/n)D$ to $nD$, where $D$ is the distance between the geophone centers, and $n$ is the number of geophones. Stacking attenuates long wavelengths but generally intervening wavelengths will have negligible attenuation. The impact array in accordance with this invention further attenuates the wavelengths attenuated by the geophone array, and provides an adjustable attenuation of the wavelengths in the band up to the wavelengths attenuated by stacking.

The method disclosed herein is an improvement and extension of the method disclosed in U.S. Pat. No. 2,698,927 by the same inventor and the specification of that patent is included herein by reference.

The method according to this invention was designed to be used with any seismic source, such as explosives, weight-drops, exploding gas, compressed air (or liquid) hammers, Vibroseis, Dinoseis, etc. The method is particularly appropriate when the reflections to be combined from more than one source originate from sources that are separated by an appreciable distance, such as more than 440 feet, but in some cases the method may be used when the separation is only 200 feet or less. The method is particularly useful when the normal moveout is large for the desired reflections; when the surface topography varies appreciably in the source area; or, when the near-surface-velocities (weathering velocities) vary appreciably.

Thus it is a primary object of this invention to provide a method for combining reflections from separate impact areas to attenuate noise having long wavelengths and thereby further enhance the desired signal reflections.

It is a further object of this invention to provide attenuation of noise having certain wavelengths which differ from the wavelengths of the desired reflected data without the necessity of repeating impacts in the field.

Another object of the invention is to provide a method for varying the effective length of the impact array to provide greater noise attenuation for deeper reflections.

It is yet a further object of this invention to provide a method for providing attenuation of noise disturbances having wavelengths lying in the range between the wavelengths attenuated by the geophone spread itself and the wavelengths which are attenuated by the stacking.

And it is a still further object of this invention to provide a method of combining seismic signals to obtain the proper moveout corrections for steep dips.

The method in accordance with the invention includes the following essential features:

1. The separate recording of reflections from a limited number of seismic sources in reproducible form;

2. Movement of the impact sources a short distance down a traverse and the recording of reflections in a separately reproducible form; and continuing the process along the traverse so that reflections are recorded for a moderate number of impact sources over the distance of one geophone group to the next geophone group;

3. The introduction of either normal moveout (NMO) or an approximate fixed time correction for each seismic trace;

4. The selection of a group of the separate seismic recordings covering an appreciable distance along the traverse, for example, such as three times the distance between geophone groups;

5. The weighting of the corrected data from the seismic recordings in the groups selected in step 4 according to the formulas set forth in U.S. Pat. No. 2,698,927;

6. The summing of the weighted data;

7. The introduction of NMO if not done in step 3; and

8. The stacking of the weighted data in the conventional manner.

The seismic reflections recorded in paragraph one may be from one or several simultaneous sources. However, if several sources are used, there may be appreciable spacing between sources as normally used. The recording may consist of one or more impacts at these same or very near these same locations.

The distance moved in step 2 along the traverse should be short enough to attenuate the shortest noise wavelengths (not otherwise attenuated by the system of geophone groups, spacing of the sources, or the filters in the field system and playback system). In general, such movement down the traverse will be at least 10 feet and maybe as large as 50 feet or more depending upon the spacing of the geophone groups. This distance is selected to attenuate the minimum wavelength of the noise observed in the area which may be ascertained by examination of a typical noise record. The distance between geophone groups is selected in the usual manner.

In regard to step 3, normal moveout (NMO) can be applied to each trace on the record or an approximate correction applied. Application of the time variable NMO for each trace is perhaps the most desirable from a theoretical consideration, but is far more time consuming in practical application than to apply an approximate fixed correction. A means of applying an approximate correction will be discussed more fully hereinafter.

The number of records selected in step 4 is determined by the wavelengths of the noise. If the noise includes wavelengths which are comparable to, or longer than, the distance between geophone groups, the proposed method is extremely effective, as will become more clearly apparent from the following description.

The description of the method will be more clearly understood with reference to the accompanying drawings wherein.

Figure 1:
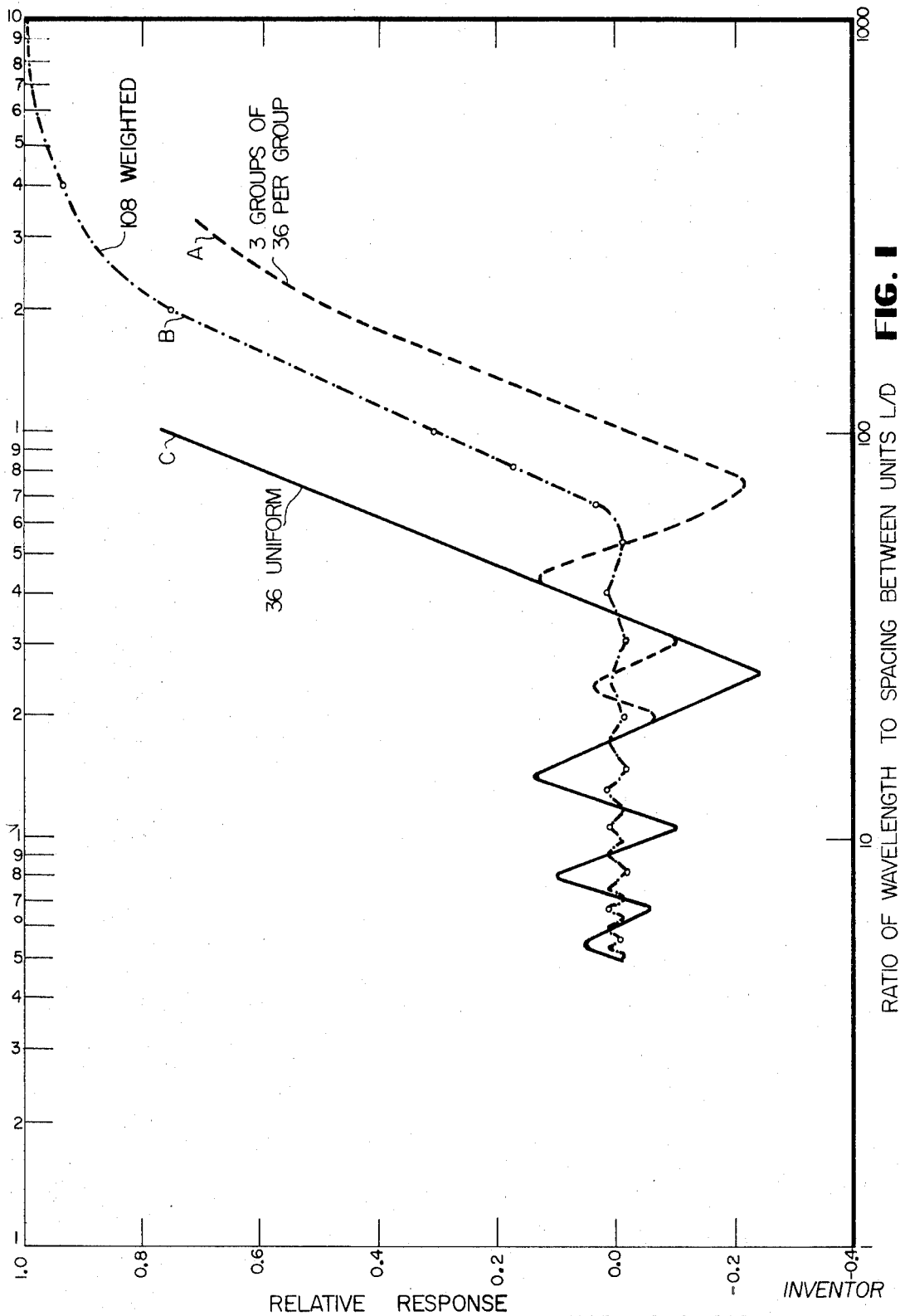
FIG. 1 illustrates the relative response of a spaced source group to the response of all the units relative to the center of the source group for three different combinations of the seismic data.

In FIG. 1, the ordinate axis represents the relative response of the spaced seismic source group to the response of the units relative to the sources at the center of the group. The abscissa represents the ratio of the wavelengths of the seismic energy to the spacing between the individually recorded seismic impact groups. Reflections from horizontal deep reflectors appear as a wavelength having infinite length. If the spread were arranged down-dip, or the reflector is shallow, the wavelengths of the reflections would be finite and will frequently approach the wavelengths of the noise to be attenuated.

The results indicated by curve A are obtained by using old techniques in combining three adjacent traces (36 sources per trace) on each record for a distance along the traverse of three times the distance of geophone group spacing (center-to-center). The result indicated by curve B is produced by the practice of the method in accordance with this invention. The response of a single group of 36 uniformly effective seismic impact units is represented by curve C.

It will be noted that curve A has a series of large peaks in the attenuation band of interest and that these peaks approach the same size as those of curve B only at L/D=2. The largest of the peaks in curve A is about 22 times the size of the peaks in curve B. It will be further noted that curve B has good response for wavelengths greater than 185 times the spacing, D, between the source groups. Wavelengths between 1.01 and 62 times the spacing are all attenuated to less than 1 percent of the relative response. The passband, which is greater than L/D=185, is relatively close to the band of good attenuation (considered to be less than L/D=62), which represents a ratio of approximately 3 to 1. Curve C has a good response for wavelengths greater than 94 times the spacing. However, two peaks, at L/D=25 and L/D=1.05, are nearly 0.24 relative response and the peaks decrease to only about 0.03 relative response at L/D=2. Curve C has peaks in the attenuation band which are approximately 24 times the peaks in curve B. Furthermore, the attenuation band in curve C is considerably narrower than that in curve B.

From the foregoing discussion and a careful examination of the curves represented in FIG. 1, it is quite apparent that the method of this invention results in a considerable attenuation (less than .01 of the relative response) of noise disturbances in the band from L/D=62 to L/D=1.04 as indicated in FIG. 1. The relative response for wavelengths from L/D equal to 1 to 5 is not shown in FIG. 1 since the peaks are too close together to provide any meaningful representation of the relative response.

For the purposes of the following description, the method will be described using a series of 3 impact groups and 4 seismic sources with 36 impact locations per group. Any type of single or multiple seismic impact source may be used for providing the seismic impulses such as explosive sources, weight-drops, exploding gas guns, compressed air, Vibroseis, or Dinoseis. The seismic sources are normally spaced along the traverse so as to provide the optimum reduction of coherent noise. In the case illustrated in FIG. 2, the seismic sources are staggered or spaced both along the traverse and at angles with the traverse. In some areas, all the sources could be along the traverse, especially in those situations where the offside reflections are negligible.

The initial record, at location 1 in group A, would be recorded from all 4 seismic sources shot simultaneously. All the seismic sources would then be moved approximately 12.2 feet parallel to the traverse to location 2 in group A (to the right in FIG. 2) and another record made from the simultaneous activation of all four seismic sources. The sources would be progressively moved to location 3 through 36 in group A, and a separate recording made from each source location. The center-to-center distances between groups of geophones and sources could be in the order of 440 feet. However, the spacing could be 220 feet or less. The spacing between locations is 12.2 feet for a 440 geophone center spacing and 6.1 feet for a 220 geophone center spacing.

Figure 2:
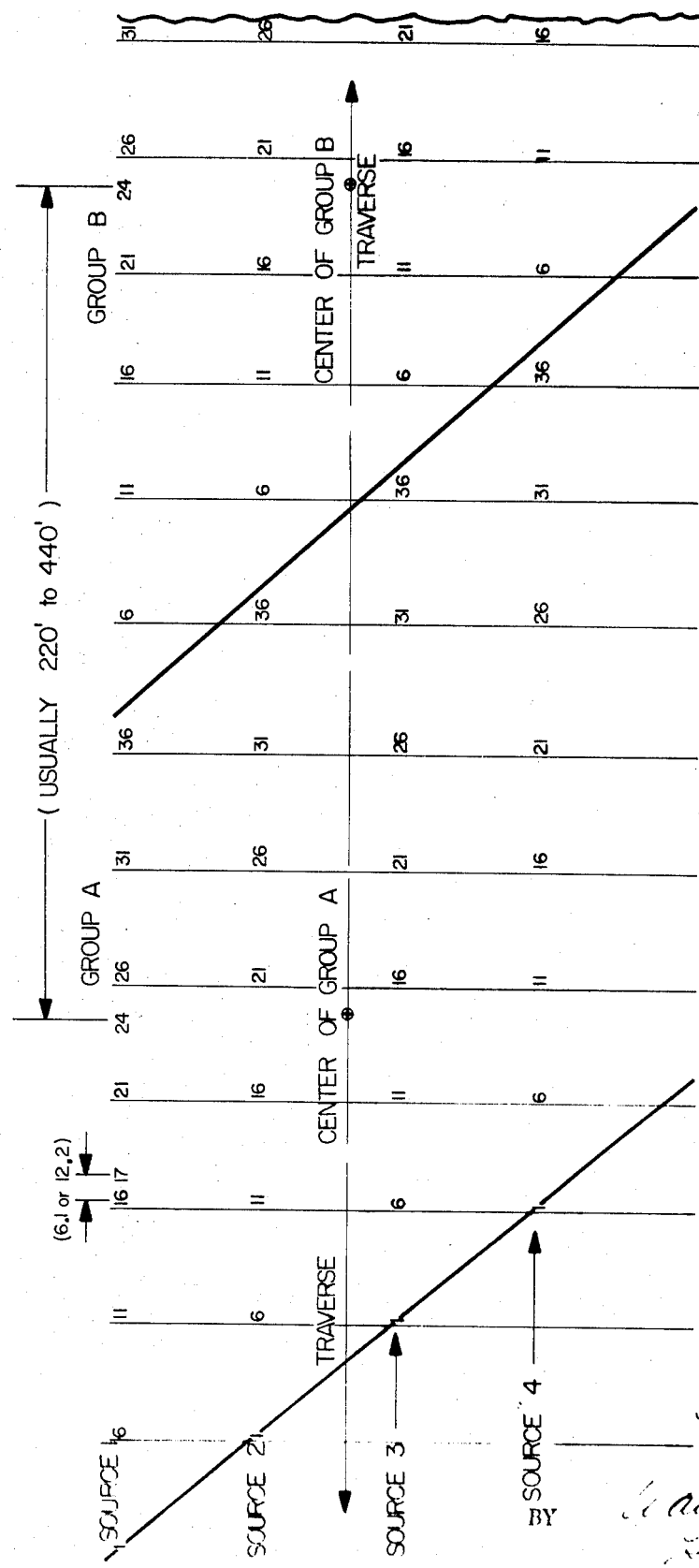
FIG. 2 is a plan view of the location of the seismic sources and the grouping of the seismic sources using four seismic impact sources at each impact location.

A total of 36 records would be made as described above for the geophone spread indicated as geophone group A in FIG. 2. The geophone array with respect to source array B will be made the same as the geophone array used with source array A. The records would then be obtained in a similar manner for the impact locations in groups B and C. It is recognized that the impact array illustrated in FIG. 2 and described herein is merely descriptive of the principle of the method and that the array, number of impact locations within a group, number of simultaneous impacts and the number of groups could all be varied in accordance with a given set of conditions and to achieve a desired noise attenuation bandwidth.

Figure 3:
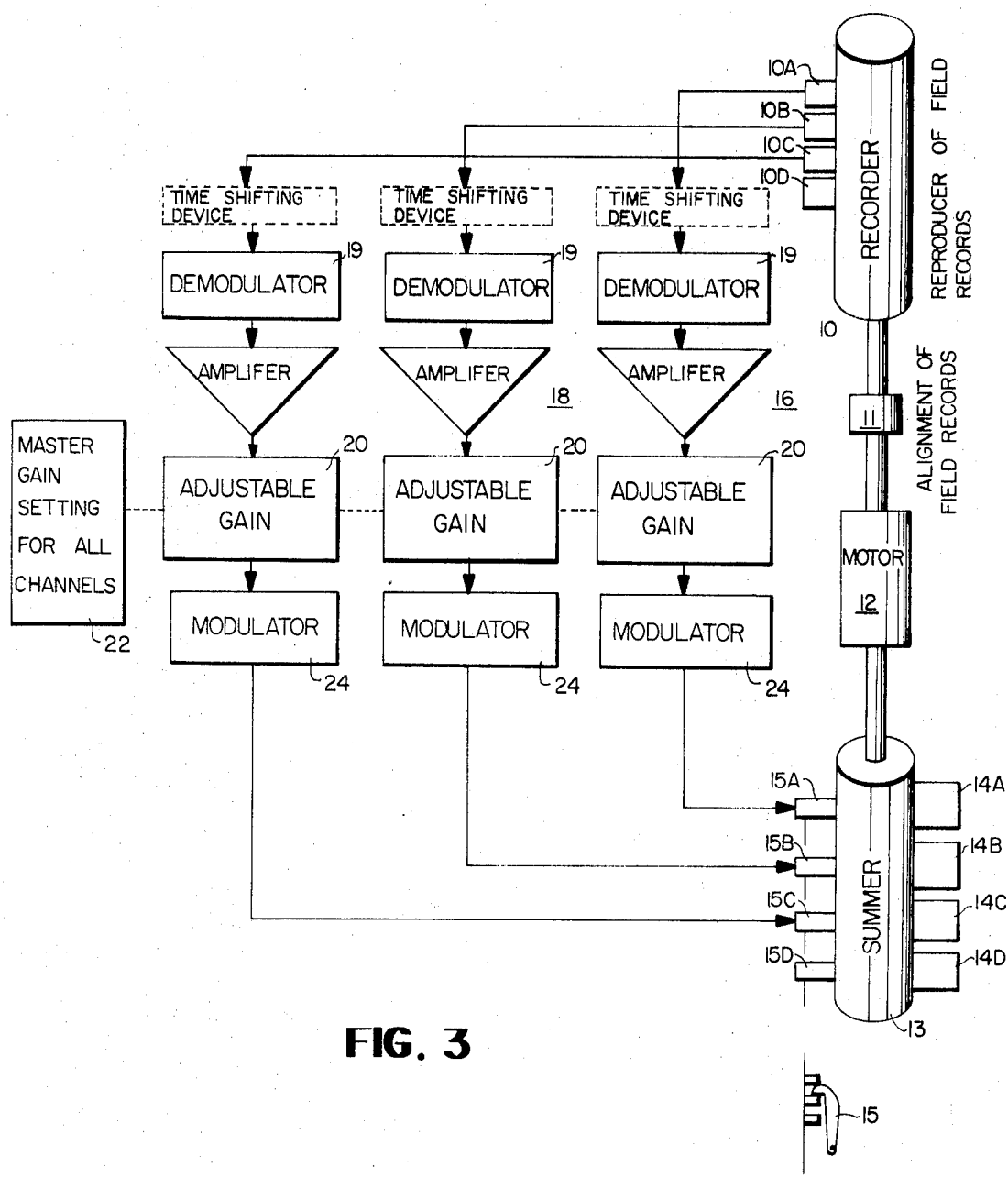
FIG. 3 is a schematic representation of apparatus for performing the method of the invention.

The means for weighting the individual seismic recordings in accordance with the invention is illustrated in FIG. 3. Recorder 10 will accept one field record at a time. The normal procedure is to place a record on the drum, process it and transcribe it to the microtracks on summer 13. The record from impact location 2 is placed on the drum; the microtrack heads on summer 13 shifted to the adjacent microtrack and the data processed. Recorder 10 may be any of the usual types utilizing bias modulation, frequency modulation, pulse-width modulation, or digital recording techniques. Heads 10A—10D are adjustable along the time scale using the apparatus as disclosed in Salvatori et al. U.S. Pat. No. 3,044,041 to provide a constant time shift and/or NMO. An alternate procedure would be to use the time shifting devices illustrated in dashed lines, which could be any of the adjustable time delays as commonly used in seismic processing techniques. Heads 10A—10D are wide read heads which are movable along their own tracks for the purposes of introducing static corrections for elevation and NMO or an approximate average deviation from the impact of the center of the impact group as will be more fully described hereinafter. Block 11 provides a means for the alignment of the time breaks between the individual recordings as is well known in the art. Motor 12 provides the necessary drive for recorder 10 and summer 13.

Wide read heads 14A—14D on summer 13 read the summation of all the microtracks on the drum. Solenoid actuated claw 15 is provided to shift all the narrow heads from one microtrack to an adjacent microtrack. Microtrack heads 15A—15D are fixed in the time scale along the track but all may be adjusted from one microtrack to the next microtrack.

Channels 16, 18 provide means for processing the information recorded on the individual channels of recorder 10. A separate channel is provided for each track of the reproducer, and in a practical application a greater number of channels would be provided. Channels 16, 18 are shown merely for purposes of this description and provide a means for processing the information on tracks 1 and 2 of the recorder 10 as shown in FIG. 3. The demodulators 19 are required for only certain types of field records such as frequency modulated recordings or pulse-width modulated recordings. The amplifiers may include AGC, filters, or other elements which are normally used with such amplifiers in processing seismic data. Adjustable gain apparatus 20 may be an adjustable amplifier or an adjustable potentiometer if analogue recording techniques are utilized. In practicing the invention, the same constant gain is used for all traces from the first impact of each of the groups. A different gain is used for the second of the subsequent impacts within each group. Since the same gain is used for each channel, a master gain-setting control 22 could be used to shift all gains simultaneously between records. The particular manner in which each of the impacts are weighted is in accordance with table I, which appears hereinafter.

The subsequent combinations of records would be from geophone groups B, C and D then geophone groups C, D and E, etc. The weighting for each of these combinations would be the same as set forth above in table I. For example, for the second combination groups B, C and D would assume the same weighting as groups A, B and C, respectively.

Modulators 24 are of the usual type known to this art and the type used will depend upon the type of summer which is used. The summer 13 may be of the microtrace type described by Doty in U.S. Pat. No. 3,065,453 and were this type of microtrace unit to be used the modulators would be mixers for bias modulation as described in the aforementioned patent.

TABLE I

| Group A | | | | Group B | | | | Group C | | | |
| --- | --- | --- | --- | --- | --- | --- | --- | --- | --- | --- | --- |
| Impact Number | Weight (percent) | Impact Number | Weight (percent) | Impact Number | Weight (percent) | Impact Number | Weight (percent) | Impact Number | Weight (percent) | Impact Number | Weight (percent) |
| 1 | 34 | 19 | 38 | 1 | 80 | 19 | 99 | 1 | 78 | 19 | 37 |
| 2 | 9 | 20 | 42 | 2 | 82 | 20 | 99 | 2 | 76 | 20 | 34 |
| 3 | 10 | 21 | 44 | 3 | 84 | 21 | 99 | 3 | 74 | 21 | 32 |
| 4 | 11 | 22 | 46 | 4 | 86 | 22 | 98 | 4 | 72 | 22 | 29 |
| 5 | 12 | 23 | 48 | 5 | 87 | 23 | 98 | 5 | 69 | 23 | 27 |
| 6 | 14 | 24 | 50 | 6 | 89 | 24 | 97 | 6 | 67 | 24 | 25 |
| 7 | 15 | 25 | 53 | 7 | 91 | 25 | 96 | 7 | 65 | 25 | 23 |
| 8 | 17 | 26 | 55 | 8 | 92 | 26 | 95 | 8 | 63 | 26 | 22 |
| 9 | 18 | 27 | 58 | 9 | 93 | 27 | 94 | 9 | 60 | 27 | 20 |
| 10 | 20 | 28 | 60 | 10 | 94 | 28 | 93 | 10 | 58 | 28 | 18 |
| 11 | 22 | 29 | 63 | 11 | 95 | 29 | 92 | 11 | 55 | 29 | 17 |
| 12 | 23 | 30 | 65 | 12 | 96 | 30 | 91 | 12 | 53 | 30 | 15 |
| 13 | 25 | 31 | 67 | 13 | 97 | 31 | 89 | 13 | 50 | 31 | 14 |
| 14 | 27 | 32 | 69 | 14 | 98 | 32 | 87 | 14 | 48 | 32 | 12 |
| 15 | 29 | 33 | 72 | 15 | 98 | 33 | 86 | 15 | 46 | 33 | 11 |
| 16 | 32 | 34 | 74 | 16 | 99 | 34 | 84 | 16 | 44 | 34 | 10 |
| 17 | 34 | 35 | 76 | 17 | 99 | 35 | 82 | 17 | 42 | 35 | 9 |
| 18 | 37 | 36 | 78 | 18 | 99 | 36 | 80 | 18 | 39 | 36 | 34 |

NOTE.—Weightings rounded off.

Regardless of the type of summer which is used it should have ample storage for all of the field records which are to be combined. For example, if 36 field sources are recorded per geophone station or group and impact sources from geophone stations are combined for three groups, 108 separate traces would be combined into one trace by summer 13. If the microtrack summer is used for this setup, 136 microtracks would be required for each wide track. If a conventional dual drum summer with only 12 microtracks per wide track were available, it could be used in the normal manner. Twelve microtracks would be recorded on drum 1 of the summer. The 12 microtracks would be read simultaneously by one wide read head and the data transferred to one microtrack on another drum 2 (not shown) of summer 13. Another 12 microtracks would be recorded on drum 1, then read by the wide head, and transferred to the second microtrack on drum 2. The process would be repeated until up to 144 field records could be combined on drum 2.

The following formulas are taken directly from U.S. Pat. No. 2,698,927 and are reproduced herein for convenience. These formulas enable the weighting factor to be calculated for any number of records, distances between centers of sources etc. and for any combination of such variable factors.

DEFINITION OF TERMS FOR GENERAL FORMULAS

In the presentation of the formulas, the following symbols are employed:

$N$ = the number of records in a line of which the outputs are combined.

$D$ = distance between the effective centers of adjacent sources for successive records.

$L$ = wavelength of received energy.

$R$ = ratio of combined record output from sources spaced in the selected pattern to the combined record output which would result by locating all of the sources at the same reference point, for any given value of L.

$S_1, S_2, i\, S_3$, etc. = *the respective weighting of the records from sources arranged in a straight line where $S_1$ represents the record from the outer most source, $S_2$ the record from the next adjacent source, etc. and the record from the center source (or records from the central pair of sources) having a weighting represented by 1.*

$n$ = the numerical order of a given record from a source in a group arranged in a straight line, proceeding from the outer ends of the line toward the center. Thus, for the record from a source at each end of the line, $n=1$, for the record from the next adjacent source, $n=2$, etc.

$$x = (N-1)\frac{S_1}{S_2}$$

a convenient arbitrary function.

$W$ = bandwidth, i.e., ratio between longest and shortest waves in a given band.

$A$ = maximum value of $R$ within the selected band.

GENERAL FORMULAE $$s_1 = \frac{x^{\frac{N-1}{2}}}{(N-1)b}$$

$$s_n = \frac{C}{b}$$

where:

$$C = x^{\frac{N-3}{2}} + \left[\frac{1}{1!}\right]\left[\frac{1}{2!}\right][n-2][N-n-1]x^{\frac{N-5}{2}} +$$

$$\left[\frac{1}{2!}\right]\left[\frac{1}{3!}\right][(n-2)(n-3)][(N-n-1)(N-n-2)]x^{\frac{N-7}{2}} +$$

$$\left[\frac{1}{3!}\right]\left[\frac{1}{4!}\right][(n-2)(n-3)(n-4)]$$

$$[(N-n-1)(N-n-2)(N-n-3)]x^{\frac{N-9}{2}} +$$

etc. to $n-1$ terms.

When $N$ is an odd number, $$b = x^{\frac{N-3}{2}} + \left(\frac{1}{1!}\right)\left(\frac{1}{2!}\right)\left(\frac{N-3}{2}\right)^2 x^{\frac{N-5}{2}} +$$

$$\left(\frac{1}{2!}\right)\left(\frac{1}{3!}\right)\left(\frac{N-3}{2}\right)^2\left(\frac{N-5}{2}\right)^2 x^{\frac{N-7}{2}} +$$

$$\left(\frac{1}{3!}\right)\left(\frac{1}{4!}\right)\left(\frac{N-3}{2}\right)^2\left(\frac{N-5}{2}\right)^2\left(\frac{N-7}{2}\right)^2 x^{\frac{N-9}{2}} +$$

etc. to $\frac{N-1}{2}$ terms.

When $N$ is an even number, $$b = x^{\frac{N-3}{2}} + \left(\frac{1}{1!}\right)\left(\frac{1}{2!}\right)\left(\frac{N-2}{2}\right)\left(\frac{N-4}{2}\right) x^{\frac{N-5}{2}} +$$

$$\left(\frac{1}{2!}\right)\left(\frac{1}{3!}\right)\left(\frac{N-2}{2}\right)\left(\frac{N-4}{2}\right)^2\left(\frac{N-6}{2}\right) x^{\frac{N-7}{2}} +$$

$$\left(\frac{1}{3!}\right)\left(\frac{1}{4!}\right)\left(\frac{N-2}{2}\right)\left(\frac{N-4}{2}\right)^2\left(\frac{N-6}{2}\right)^2\left(\frac{N-8}{2}\right) x^{\frac{N-9}{2}} +$$

etc. to $\frac{N-2}{2}$ terms.

As previously mentioned, the application of time variable NMO to each trace on the record is the most desirable from a theoretical consideration; however, such corrections are time consuming and, therefore, expensive. It is, therefore, desirable to provide an approximate fixed correction for NMO which is done in the following manner.

No correction is applied to traces generated from impact sources at the center of the source group to be combined. A small time shift is applied to each trace generated from sources adjacent to the center of the source group thereby shifting the reflections to approximately the same time as the corresponding reflection from the central source. Such a fixed correction is too small for shallow reflection and too large for the deepest desired reflections, but is within acceptable accuracy. A progressively larger shift is applied to those traces generated by the sources father removed from the center of the source array.

The improvement of the method disclosed herein over that which is disclosed in U.S. Pat. No. 2,698,927 resides primarily in the fact that in the improved method the reflections for each location of the impact source are recorded individually and the data is weighted prior to being summed and stacked in the conventional manner. In the patented method the reflections from the impact sources were recorded simultaneously and the weighting was applied either by weighting the charge or adjusting the sensitivity of the transducer elements. Furthermore, the fact that the data is recorded individually enables the improved method to have a considerably greater flexibility and adaptability over the patented method. For example, in the improved method, the grouping of records may be altered to provide the most advantageous combination of data, whereas, in the patented method the grouping of the courses and the data was determined at the time of impact and therefore unalterable. Obviously, by keeping the impact data in separately reproducible form, the recorded data can be processed as desired.

A further advantage and distinction of the improved method over the patented method is that the noise may be further analyzed from the data itself to select the desired bandwidth and then determine the manner in which the data is to be combined to provide the necessary attenuation of the noise disturbances.

The improved method enables the impact data to be used more than once, for example, as described above, wherein, the information is used in the various groupings such as A, B, C; B, C, D; C, D, E, etc.

The improved method also enables the bandwidth to be altered to provide the optimum enhancement and reduction of noise in the composited record.

It is important to note that in the practice of the instant method a decision must be made in the field prior to the recording of the records as to whether the record will be recorded in the normally composited form wherein each impact is recorded on an adjacent microtrack and then the microtracks are summed. When the data is recorded in this manner the individual recorded data on each microtrack is irretrievable because there is overlapping of information between adjacent tracks. This decision can be made by an analysis of the noise record which is normally taken prior to the exploration of an area. If an analysis of this noise record indicates that there will be noise disturbances in a band not attenuated by the system or stacking, then the various impacts may be recorded separately to utilize the disclosed improved method.

Those skilled in the art will recognize other modifications of the method. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

I claim:

1. A method for deleting undesirable noise signals from seismic records to enhance the reflections of seismic signals, comprising the steps of:
   1. Individually recording seismic signals from at least one seismic source at a selected number of impact locations;
   2. Successively moving the source to other selected locations and individually recording successive additional seismic signals at these other locations;
   3. Forming selected groups of said individual recorded seismic signals wherein selected individual seismic signals form part of more than one of said groups;
   4. Providing a weighting to said seismic signals; and
   5. Summing the seismic signals and stacking the summed signals.

2. A method according to claim 1 wherein adjacent groups include the same recorded seismic signals and the position of the same recorded seismic signals varies between the groups so that a given recorded seismic signal receives a different weighting factor in the different groups.

3. A method according to claim 1 wherein the step of summing the seismic signals includes applying average time shifts for the normal moveout differential to at least one of said groups of individually recorded seismic signals, and said average time shifts are progressively greater for the seismic signals recorded more remotely from the center of the group of seismic signals.

4. A method for deleting undesirable noise signals from seismic records to enhance the reflections of seismic signals, comprising the steps of:
   1. Individually recording seismic records from at least one seismic source at a selected number of different impact location;
   2. Successively moving said at least one seismic source to other selected locations and generating successive additional seismic records at these other locations;
   3. applying normal moveout corrections to the seismic records;
   4. forming groups of said individually recorded seismic records so that selected seismic records form part of more than one of said groups; and
   5. summing and stacking the seismic groups whereby information on selected seismic records is used more than once.

5. A method according to claim 4 wherein the step of applying normal moveout corrections to the seismic records includes applying weighting to said individually recorded seismic signals.

6. A method according to claim 4 wherein the step of forming groups of individually recorded seismic records includes varying the position of the same recorded seismic signal among the said groups of seismic records so that a given recorded seismic signal receives a different degree of weighting in the various said groups of individually recorded seismic records.

PO-1050
(5/69)

UNITED STATES PATENT OFFICE
CERTIFICATE OF CORRECTION

Patent No. 3,569,922  Dated March 9, 1971

Inventor(s) Josephus O. Parr, Jr.

It is certified that error appears in the above-identified patent and that said Letters Patent are hereby corrected as shown below:

ABSTRACT, line 3, after "attenuation" and before "afforded" insert --bandwidths--.
Column 5, line 58, after "$S_2$," and before "$S_3$" delete --i--; line 61, change "center" to --central--.
Column 7, line 10, change "father" to --farther--.
Column 8, line 40, change "location" to --locations--.

Signed and sealed this 17th day of August 1971.

(SEAL)
Attest:

EDWARD M. FLETCHER, JR.
Attesting Officer

WILLIAM E. SCHUYLER, J.
Commissioner of Paten